United States Patent
Okamoto et al.

(10) Patent No.: US 9,749,603 B2
(45) Date of Patent: Aug. 29, 2017

(54) PROJECTOR LIGHT SOURCE UNIT HAVING INTENSITY CONTROLLER

(71) Applicant: USHIO DENKI KABUSHIKI KAISHA, Tokyo (JP)

(72) Inventors: Masashi Okamoto, Hyogo (JP); Takanori Samejima, Hyogo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 14/803,761

(22) Filed: Jul. 20, 2015

(65) Prior Publication Data
US 2015/0331304 A1 Nov. 19, 2015

Related U.S. Application Data

(63) Continuation of application No. PCT/JP2014/051930, filed on Jan. 29, 2014.

(30) Foreign Application Priority Data

Jan. 30, 2013 (JP) .................................. 2013-015059
Dec. 24, 2013 (JP) .................................. 2013-265207

(51) Int. Cl.
*H04N 9/31* (2006.01)
*G03B 21/20* (2006.01)
(Continued)

(52) U.S. Cl.
CPC .......... *H04N 9/3155* (2013.01); *G03B 21/208* (2013.01); *G03B 21/2013* (2013.01);
(Continued)

(58) Field of Classification Search
CPC ............ G03B 21/2033; G03B 21/2053; G03B 21/208; G03B 33/06; H01S 5/0683;
(Continued)

(56) References Cited

U.S. PATENT DOCUMENTS 7,300,155 B2 * 11/2007 Miyazawa ............. H04N 9/315
348/E9.027
7,329,009 B2 * 2/2008 Monch ................. H04N 9/3114
348/743
(Continued)

FOREIGN PATENT DOCUMENTS

JP H06-050841 A 2/1994
JP H09-269248 A 10/1997
(Continued)

OTHER PUBLICATIONS

International Search Report issued in Application No. PCT/JP2014/051930, mailed May 13, 2014.

*Primary Examiner* — Bao-Luan Le
(74) *Attorney, Agent, or Firm* — Michael Best & Friedrich LLP

(57) ABSTRACT

A light source unit includes: a plurality of elemental light sources; an optical sensor; a light quantity measurement circuit; and a control circuit. The plurality of elemental light sources each include one or more light emitting elements, one or more drive circuits, a focusing optical system, and an optical fiber. The one or more drive circuits selectively operate in a driving state or in a non-driving state. The control circuit performs a sequence that sequentially acquires light quantity measurement data by sequentially selecting one of the plurality of elemental light sources, putting at least one of the one or more drive circuits included in the selected elemental light source into a first state, and putting the plurality of drive circuits other than the at least one drive circuit into a second state, and detects abnormality based on a plurality of pieces of the acquired light quantity measurement data.

11 Claims, 4 Drawing Sheets

(51) Int. Cl.
*H05B 37/03* (2006.01)
*H05B 33/08* (2006.01)

(52) U.S. Cl.
CPC ..... *G03B 21/2033* (2013.01); *G03B 21/2053* (2013.01); *H04N 9/3161* (2013.01); *H04N 9/3182* (2013.01); *H04N 9/3194* (2013.01); *H05B 33/0869* (2013.01); *H05B 37/03* (2013.01)

(58) Field of Classification Search
CPC .. H04N 9/3155; H04N 9/3182; H04N 9/3194; H05B 33/086; H05B 33/0869
See application file for complete search history.

(56) References Cited

U.S. PATENT DOCUMENTS

| | | | | |
|---|---|---|---|---|
| 7,377,654 | B2* | 5/2008 | Miyazawa | H04N 9/315 348/E9.027 |
| 7,717,565 | B2* | 5/2010 | Miyazawa | H04N 9/315 347/255 |
| 7,810,930 | B2* | 10/2010 | Miyazawa | H04N 9/315 348/742 |
| 8,777,425 | B2* | 7/2014 | Miyazawa | H04N 9/315 353/98 |
| 2005/0128441 | A1* | 6/2005 | Morgan | G03B 21/2033 353/102 |
| 2005/0168710 | A1* | 8/2005 | Miyazawa | H04N 9/315 353/98 |
| 2006/0023304 | A1* | 2/2006 | Monch | H04N 9/3114 359/443 |
| 2006/0274278 | A1* | 12/2006 | Lee | G03B 21/2013 353/53 |
| 2006/0279710 | A1* | 12/2006 | Tani | H04N 5/7458 353/85 |
| 2007/0121077 | A1* | 5/2007 | Miyazawa | H04N 9/315 353/30 |
| 2008/0273123 | A1* | 11/2008 | Morikawa | H04N 9/3105 348/757 |
| 2011/0199582 | A1* | 8/2011 | Kuriki | A61B 3/1225 353/31 |
| 2012/0252372 | A1 | 10/2012 | Kihara et al. | |
| 2013/0229629 | A1* | 9/2013 | Kawamoto | H04N 9/31 353/30 |
| 2014/0313422 | A1* | 10/2014 | Kanno | H04N 9/3111 348/744 |
| 2015/0138509 | A1* | 5/2015 | Domm | G03B 21/204 353/31 |
| 2015/0138510 | A1* | 5/2015 | Domm | G02B 27/1026 353/31 |
| 2015/0138511 | A1* | 5/2015 | Domm | G02B 27/106 353/31 |

FOREIGN PATENT DOCUMENTS

| | | |
|---|---|---|
| JP | H10-038751 A | 2/1998 |
| JP | H10-133303 A | 5/1998 |
| JP | H11-005187 A | 1/1999 |
| JP | H11-344417 A | 12/1999 |
| JP | 2001-142141 A | 5/2001 |
| JP | 2002-350694 A | 12/2002 |
| JP | 2003-279444 A | 10/2003 |
| JP | 2004-219244 A | 8/2004 |
| JP | 2004-252112 A | 9/2004 |
| JP | 2006-064399 A | 3/2006 |
| JP | 2012-147860 A | 8/2012 |
| JP | 2012-209793 A | 10/2012 |
| JP | 2012-216299 A | 11/2012 |
| WO | WO-2011/052418 A1 | 5/2011 |

* cited by examiner

PROJECTOR LIGHT SOURCE UNIT HAVING INTENSITY CONTROLLER

CROSS REFERENCE TO RELATED APPLICATIONS

This is a continuation of International Application No. PCT/JP2014/051930, filed Jan. 29, 2014, which claims the benefit of Japanese Priority Patent Application JP2013-015059, filed Jan. 30, 2013, and Japanese Priority Patent Application JP2013-265207, filed Dec. 24, 2013, the entire contents of all of which are incorporated herein by reference.

BACKGROUND

The present invention relates to a light source unit that is usable in an optical apparatus such as a projector and uses a light emitting element such as a semiconductor laser and an optical fiber, and to a projector.

For example, in an image display projector such as DLP (registered trademark) projector and a liquid crystal projector and in a photomask exposure apparatus, a high luminance discharge lamp (HID lamp) such as a xenon lamp and an ultra-high pressure mercury lamp has been used so far.

As an example, a principle of a projector is described with reference to FIG. 4 (see Japanese Unexamined Patent Application Publication No. 2004-252112, etc.). FIG. 4 is a diagram explaining a part of one kind of existing projector.

Light from a light source (SjA) formed of a high luminance discharge lamp or the like enters an incident end (PmiA) of a homogenizing means (FmA) with the help of focusing means (illustration thereof is omitted) formed of a concave reflector or lens, and entering light is output from an exit end (PmoA).

Here, as the homogenizing means (FmA), for example, a light guide may be used. The light guide is also referred to as a rod integrator, a light tunnel, or the like, and is configured of a prism formed of a light transmissive material such as glass and a resin. When the light guide is used as the homogenizing means (FmA), light entering the incident end (PmiA) is totally reflected repeatedly by side surfaces of the homogenizing means (FmA) and propagates in the homogenizing means (FmA), in accordance with the principle same as that of the optical fiber. Accordingly, even if distribution of light entering the incident end (PmiA) has unevenness, the homogenizing means (FmA) configured of a light guide functions to sufficiently uniformize illuminance on the exit end (PmoA).

Note that, in addition to the light guide configured of a prism formed of a light transmissive material such as glass and a resin described above, there is a light guide that is a hollow square tube and whose inner surface is configured of a reflector. The light guide of this type performs the same function as that of the light guide configured of a prism, by propagating light while allowing the light to be reflected repeatedly by the inner surface.

Further, in the projector of FIG. 4, an illumination lens (Ej1A) is disposed such that a square image of the exit end (PmoA) by the light output from the exit end (PmoA) is formed on a two-dimensional light intensity modulator (DmjA). Therefore, the two-dimensional light intensity modulator (DmjA) is illuminated with the light output from the exit end (PmoA). Incidentally, in FIG. 4, a mirror (MjA) is disposed between the illumination lens (Ej1A) and the two-dimensional light intensity modulator (DmjA).

Then, the two-dimensional light intensity modulator (DmjA) directs the light to a direction entering an image projection lens (Ej2A) for each pixel, according to a picture signal. Alternatively, the two-dimensional light intensity modulator (DmjA) so modulates the light as to direct the light to a direction not entering the image projection lens (Ej2A) for each pixel, to display an image on a screen (Tj).

Note that the two-dimensional light intensity modulator as described above is also called light bulb, and in the case of the optical system of FIG. 4, normally, DMD (registered trademark, digital micro-mirror device) is often used as the two-dimensional light intensity modulator (DmjA).

In addition to the above-described light guide, the homogenizing means includes a fly eye integrator. A principle of a projector using the fly eye integrator as the homogenizing means is described with reference to FIG. 5, as an example (see Japanese Unexamined Patent Application Publication No. 2001-142141, etc.). FIG. 5 is a diagram explaining a part of one kind of an existing projector.

In the projector of FIG. 5, light from a light source (SjB) configured of a high luminance discharge lamp or the like enters, as substantially parallel luminous flux, an incident end (PmiB) of the homogenizing means (FmB) configured of a fly eye integrator with the help of collimator means (illustration thereof is omitted) formed of a concave reflector, lens, or the like, and entering light is output from an exit end (PmoB).

Here, the homogenizing means (FmB) is configured by combination of a front fly eye lens (F1B) on incident side, a rear fly eye lens (F2B) on exit side, and an illumination lens (Ej1B).

Each of the front fly eye lens (F1B) and the rear fly eye lens (F2B) is formed by arranging a plurality of square lenses that has the same focusing distance and the same shape vertically and horizontally.

Each of the front fly eye lenses (F1B) and the rear fly eye lens (F2B) corresponding thereto configure Kohler illumination optical system, and thus, a plurality of Kohler illumination optical systems are arranged vertically and horizontally.

Typically, Kohler illumination optical system is configured of two lenses and illuminates a target surface (a surface desired to be illuminated) uniformly. At the time of illuminating the target surface by collecting light with a front lens, the two lenses are disposed so that the front lens forms a light source image not on the target surface but on a center of a surface of a rear lens and the rear lens forms an image of a square of an outer shape of the front lens on the target surface. The action of the rear lens is to prevent phenomenon occurred in a case where the rear lens is not provided, specifically, phenomenon in which, when the light source is not a complete point light source and has a finite size, illuminance in the periphery of the square image on the target surface is dropped depending on the size. It is possible to uniform illuminance over to the periphery of the square image on the target surface by the action of the rear lens, without depending on the size of the light source.

Here, in the case of the optical system in FIG. 5, substantially parallel luminous flux basically enters the homogenizing means (FmB). Therefore, the front fly eye lens (F1B) and the rear fly eye lens (F2B) are disposed such that a distance therebetween becomes equal to the focusing distance thereof, and therefore, an image on the target surface of uniform illumination as Kohler illumination optical system is generated to the infinity. Incidentally, since the illumination lens (Ej1B) is disposed on a rear stage of the rear fly eye lens (F2B), the target surface is drawn on a focusing surface of the illumination lens (Ej1B) from the infinity.

Each of the plurality of Kohler illumination optical systems arranged vertically and horizontally is parallel to an incident optical axis (ZiB), and luminous flux enters each of the Kohler illumination optical systems substantially axisymmetrically to the center axis thereof. Therefore, output luminous flux is also axisymmetrical. Accordingly, images of the outputs of all of the Kohler illumination optical systems are formed on the same target surface on the focusing surface of the illumination lens (Ej1B) by property of the lens in which light beams entering a lens surface at the same angle are so refracted as to travel toward the same point on the focusing surface irrespective of incident positions of the respective light beams on the lens surface, namely, Fourier transform function of the lens.

As a result, illumination distributions on the respective lens surfaces of the front fly eye lenses (F1B) are all overlapped, and thus a synthesized square image whose illuminance distribution is more uniform than that in the case of one Kohler illumination optical system, is formed on the incident optical axis (ZiB). When the two-dimensional light intensity modulator (DmjB) serving as an illumination target is disposed on the position of the synthesized square image, the two-dimensional light intensity modulator (DmjB) is illuminated with light output from the exit end (PmoB). Incidentally, in the illumination, a polarization beam splitter (MjB) is disposed between the illumination lens (Ej1B) and the two-dimensional light intensity modulator (DmjB) to reflect the light toward the two-dimensional light intensity modulator (DmjB).

Then, the two-dimensional light intensity modulator (DmjB) modulates the light and reflects the modulated light such that the polarization direction of light for each pixel is rotated by 90 degrees or is not rotated, according to a picture signal. As a result, only the rotated light passes through the polarization beam splitter (MjB) and enters an image projection lens (Ej3B), thereby displaying an image on the screen (Tj).

Incidentally, in the case of the optical system in FIG. 5, typically, LCOS (registered trademark, silicon liquid crystal device) is often used as the two-dimensional light intensity modulator (DmjB). In a case of such a liquid crystal device, only a component of light in a specified polarization direction is effectively modulated. Therefore, a component of light parallel to the specified polarization direction is normally transmitted as is. However, in the optical system in FIG. 5, a polarization aligning device (PcB) that rotates polarization direction of only a component of light perpendicular to the specified polarization direction by 90 degrees and consequently allows all of light to be effectively used may be interposed, for example, on a rear stage of the rear fly eye lens (F2B). In addition, for example, a field lens (Ej2B) may be interposed immediately before the two-dimensional light intensity modulator (DmjB) so that substantially parallel light enters the two-dimensional light intensity modulator (DmjB).

Incidentally, in addition to the reflective two-dimensional light intensity modulator illustrated in FIG. 5, a transmissive liquid crystal device (LCD) in a compatible optical arrangement is also used as the two-dimensional light intensity modulator (see Japanese Unexamined Patent Application Publication No. H10-133303, etc.).

Incidentally, in a typical projector, to perform color display of an image, for example, a dynamic color filter such as a color wheel is disposed on the rear stage of the homogenizing means to illuminate the two-dimensional light intensity modulator with color sequential luminous fluxes of R (red), G (green), and B (blue), and color display is achieved time-divisionally. Alternatively, a dichroic mirror or a dichroic prism is disposed on the rear stage of the homogenizing means to illuminate the two-dimensional light intensity modulator that is provided independently for each color, with light color-separated to three primary colors of R, G, and B, and a dichroic mirror or a dichroic prism is disposed to perform color synthesis of the modulated luminous fluxes of the three primary colors of R, G, and B. However, to avoid complication, these are omitted in FIG. 4 and FIG. 5.

However, the high luminance discharge lamp disadvantageously has low conversion efficiency from supplied power to optical power, namely, large heating loss, short lifetime, or the like.

As an alternate light source overcoming these disadvantages, a solid light source such as an LED and a semiconductor laser has attracted attention in recent years.

Among them, the LED has smaller heating loss and longer life time as compared with the discharge lamp. However, light radiated from the LED does not have directivity similarly to the discharge lamp, and thus usage efficiency of light is disadvantageously low in an application using only light in a certain direction, such as the projector and an exposure apparatus.

On the other hand, the semiconductor laser has a disadvantage that speckle occurs due to high coherency, but the disadvantage is overcome by various technical improvement such as usage of a diffuser plate. Since the semiconductor laser has small heating loss and long lifetime similarly to LED and has high directivity, the semiconductor laser advantageously has high usage efficiency of light in application using only light in a certain direction, such as the projector and the exposure apparatus described above. Moreover, the semiconductor laser utilized high directivity to perform optical transmission by optical fibers with high efficiency. Therefore, it is possible to separate the installation position of the semiconductor laser from the position of a projector or the like using the light. Consequently, it is possible to enhance flexibility of device designing.

Incidentally, even in the case where the same current flows, the brightness of the semiconductor laser varies due to environment temperature variation or temperature increase by self heating, and further due to deterioration associated with increase of accumulated conduction time. Therefore, in the case where the semiconductor laser is applied to a projector, feedback control may be desirably performed in order to stabilize light quantity. To realize the stabilization of light quantity, means to measure a light quantity is necessary, and in particular, an optical sensor to measure the light quantity of each of colors R, G, and B at a light inlet of the projector, namely, at exit ends of the optical fibers, may be desirably provided.

Incidentally, the optical fiber has disadvantage of risk of breakage because the optical fiber is made of vulnerable glass such as quartz in spite of convenience.

For example, in a case where a projector having brightness of ten thousand ANSI lumen, it is necessary to transmit optical power of about 200 W by optical fibers, depending on efficiency of the optical system. Accordingly, if the optical power is transmitted by six optical fibers, it is necessary to transmit optical power of 30 W or higher per one optical fiber. Incidentally, when the number of optical fibers is increased, power per one optical fiber is decreased. However, this increases cost, and therefore, it is difficult to increase the number of optical fibers immoderately. Moreover, if the optical fiber transmitting such large power is broken, the optical power is leaked from the broken point, and is absorbed by a covering material provided for mechanically protecting the optical fibers, which may result in fire damage of the covering material. Therefore, when the optical fiber is broken, safety measures that detect the breakage of the optical fiber to turn off the semiconductor laser are necessary.

For the optical fiber, a technology to detect breakage has been developed from high power application in which such fire damage of a component may occur to low power application for communication, etc.

For example, in Japanese Unexamined Patent Application Publication No. H06-050841, there is disclosed a technology mainly for an optical fiber for communication in which light with a wavelength to be transmitted and monitor light with a wavelength different from the light with the wavelength to be transmitted are transmitted from transmission side, a filter that reflects and returns the monitor light is provided on reception side, and presence of return of the monitor light is monitored on the transmission side to detect breakage of the optical fiber.

Further, in Japanese Unexamined Patent Application Publication No. H09-269248, there is disclosed a technology mainly for an optical fiber for communication in which presence of breakage of an optical fiber is detected based on a waveform of returned light at the time when pulsed light enters the optical fiber, and a distance to a break point is calculated if the optical fiber is broken.

Moreover, in Japanese Unexamined Patent Application Publication No. H10-038751, there is disclosed a technology mainly for a high-power optical fiber for laser processing in which an optical sensor detecting stray light in a lens system is disposed near the lens system on each of incident end side and exit end side of the optical fiber, and detected light quantity of both of the optical sensors are compared to detect breakage of the optical fiber.

Further, in Japanese Unexamined Patent Application Publication No. H11-005187, there is disclosed a technology mainly for a high-power optical fiber for laser processing in which a protection tube covering the optical fiber is provided, a plurality of sensors each detecting laser light leaked from the optical fiber are arranged inside the protection tube, and thus breakage of the optical fiber is detected.

Further, in Japanese Unexamined Patent Application Publication No. H11-344417, there is mainly disclosed a technology in which light with a wavelength to be transmitted and monitor light with a wavelength different from the light with the wavelength to be transmitted are transmitted through a high-power optical fiber for laser processing from transmission side, and presence of the monitor light is monitored on reception side to detect breakage of the optical fiber.

Further, in Japanese Unexamined Patent Application Publication Nos. 2002-350694 and 2004-219244, there are disclosed technologies mainly for an optical fiber for communication or for laser processing in which a conductive covering film is provided on an outer peripheral surface of the optical fiber, and conduction state between incident end side and exit end side is monitored to detect breakage of the optical fiber.

Further, in Japanese Unexamined Patent Application Publication No. 2003-279444, there is disclosed a technology mainly for a high-power optical fiber for laser processing in which a cable including a plurality of temperature fuses connected in series is disposed along the optical fiber, and breakage of the optical fiber is detected based on melting of the temperature fuses.

Further, in Japanese Unexamined Patent Application Publication No. 2006-064399, there is disclosed a technology mainly for an optical fiber for communication in which presence of breakage of an optical fiber is detected based on a phase difference between incident modulated light and returned modulated light, and a distance to a break point is calculated if the optical fiber is broken.

Further, in Japanese Unexamined Patent Application Publication No. 2012-147860, there is disclosed a technology mainly for an optical fiber for endoscope illumination in which breakage of an optical fiber is detected based on a ratio between quantity of entered light and quantity of returned light that are measured at a light incident end of the optical fiber.

SUMMARY

However, application of these technology in related art to a case where the semiconductor laser is used as the light source for projector as described above is not advantageous.

This is because, when a plurality of optical fibers are simultaneously used, providing any mechanism such as a light source of monitor light and breakage detection mechanism on each optical fiber results in high cost.

As described above, when the optical sensor to measure the light quantity of each of colors R, G, and B at an exit end of the optical fiber is disposed in order to stabilize the light quantity, it is advantageous to establish a technology of detecting breakage of the optical fiber that uses the optical sensor.

It is desirable to provide a light source unit and a projector each configured to detect abnormality such as breakage of individual optical fibers through light quantity measurement targeting not output luminous fluxes of individual optical fibers but output luminous flux that are obtained by integrating radiated light from all of the optical fibers.

According to an embodiment of the invention, there is provided a light source unit including: a plurality of elemental light sources each including one or more light emitting elements, one or more drive circuits, a focusing optical system, and an optical fiber, and configured to integrate radiated light from exit ends of the respective optical fibers to output one output luminous flux, the one or more drive circuits being provided corresponding to the respective light emitting elements and selectively operating in a driving state allowing a specified current to flow through the corresponding light emitting element or in a non-driving state allowing the current not to flow through the corresponding light emitting element, the focusing optical system focusing light emitting from the one or more light emitting elements, and the optical fiber receiving light focused by the focusing optical system at an incident end to guide the light and radiating the light from the exit end; an optical sensor irradiated with at least a part of the output luminous flux; a light quantity measurement circuit configured to generate light quantity measurement data correlated with a light quantity of the output luminous flux, based on a quantity of incident light to the optical sensor; and a control circuit configured to control the plurality of drive circuits based on the light quantity measurement data, to perform a sequence sequentially acquiring the light quantity measurement data by sequentially selecting one of the plurality of elemental light sources, putting at least one of the one or more drive circuits included in the selected elemental light source into a first state, and putting the plurality of drive circuits other than the at least one drive circuits into a second state, and to detect abnormality based on measurement data set formed of a plurality of pieces of the acquired light quantity measurement data, the first state being one of the driving state and the non-driving state, and the second state being the other of the driving state and the non driving state.

According to an embodiment of the invention, there is provided a projector including: the light source unit described above; and an apparatus configured to use the output luminous flux output from the light source unit, the apparatus transmitting one of an abnormality detection activation signal and a sequence step signal to the light source unit.

According to the light source unit and the projector of the respective embodiments of the invention, it is possible to detect abnormality such as breakage of individual optical fibers by light quantity measurement with respect to not the output luminous fluxes of the respective optical fibers but the output luminous flux that is obtained by integrating radiated light from all of the optical fibers.

a. It is to be understood that both the foregoing general description and the following detailed description are exemplary, and are intended to provide further explanation of the technology as claimed. Effects achieved by the invention may be those that are different from the above-described effects, or may include other effects in addition to those described above.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
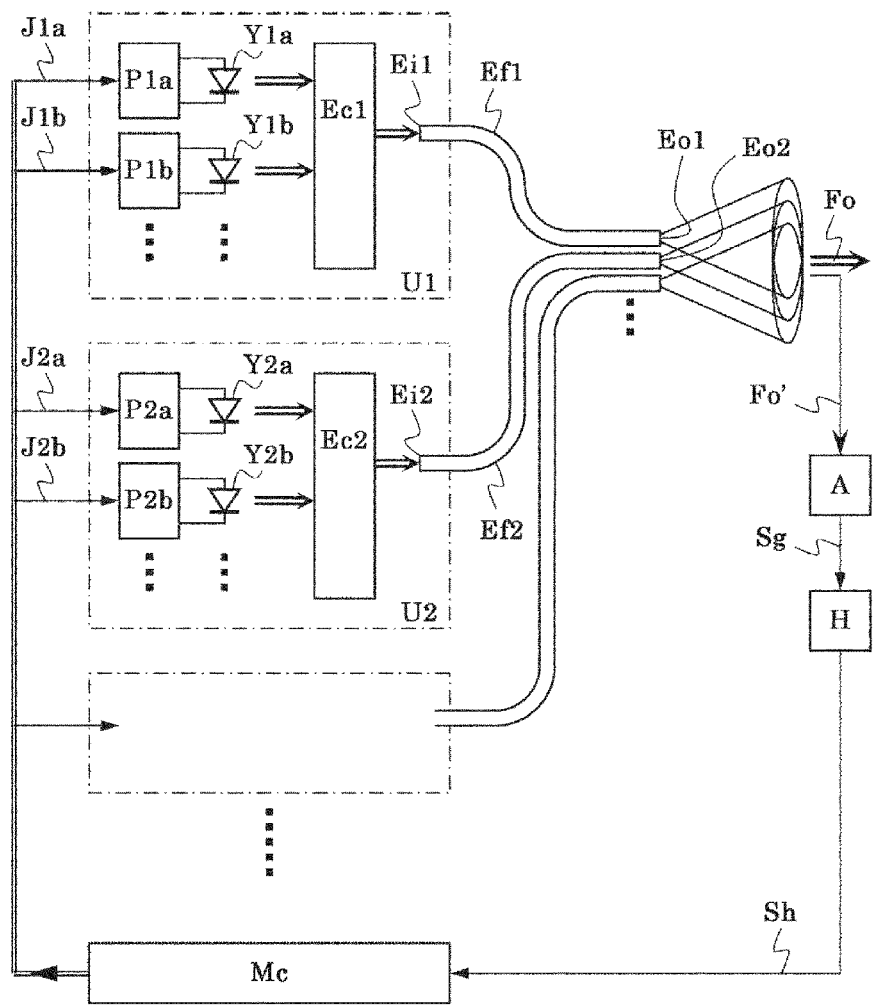
FIG. 1 is a block diagram illustrating a light source unit according to an embodiment of the invention in a simplified manner.

First, an embodiment of the invention is described with reference to FIG. 1. FIG. 1 is a block diagram illustrating a light source unit according to an embodiment of the invention in a simplified manner.

In the light source unit according to the embodiment of the invention in FIG. 1, light emitting elements ($Y1a$, $Y1b$, . . . ) provided in an elemental light source (U1) are respectively driven by drive circuits ($P1a$, $P1b$, . . . ) and emit light. Then, light emitted from the respective light emitting elements ($Y1a$, $Y1b$, . . . ) are focused at an incident end (Ei1) of an optical fiber (Ef1) by a focusing optical system (Ec1) formed of, for example, a lens, and focused light propagates through a core of the optical fiber (Ef1) and is radiated from an exit end (Eo1) of the optical fiber (Ep1).

Note that each of the light emitting elements ($Y1a$, $Y1b$, . . . ) may be driven by a single drive circuit ($P1a$, $P1b$, . . . ) by connecting a plurality of light sources in series, in parallel, or in series-parallel. As the light sources, for example, a semiconductor laser or a light source that converts wavelength of radiated light of a semiconductor laser with use of non-linear optical phenomenon such as harmonic generation and optical parametric effect may be used.

Moreover, each of the drive circuits ($P1a$, $P1b$, . . . ) may be a DC/DC converter that is fed with power by a DC power source (not illustrated) and may be configured of, for example, a step-down chopper circuit or a step-up chopper circuit. The drive circuits ($P1a$, Pab, . . . ) supply predetermined power to the respective light emitting elements ($Y1a$, $Y1b$, . . . ).

The light source unit according to the embodiment of the invention in FIG. 1 includes a plurality of elemental light sources similar to the elemental light source (U1). Radiated light from exit ends (Eo1, Eo2, . . . ) of respective optical fibers (Ef1, Ef2, . . . ) of the plurality of elemental light sources (U1, U2, . . . ) are integrated, and integrated light is output from the light source unit according to the embodiment of the invention, as a single output luminous flux (Fo).

Note that, to integrate the radiated light from the plurality of exit ends (Eo1, Eo2, . . . ), exit ends of the plurality of optical fibers (Ef1, Ef2, . . . ) are bundled such that the plurality of exit ends (Eo1, Eo2, . . . ) are aligned so as to be positioned on the same plane, that is the simplest way.

To generate light quantity measurement data (Sh) correlated with light quantity of the output luminous flux (Fo), measurement-use output luminous flux (Fo') that is formed by integrating part of the radiated light from the plurality of exit ends (Eo1, Eo2, . . . ), is generated similarly to the output luminous flux (Fo). Then, the measurement-use output luminous flux (Fo') is applied to an optical sensor (A), and necessary processing such as amplification and AD conversion is performed on a signal (Sg) of the optical sensor (A) by a light quantity measurement circuit (H) to generate the light quantity measurement data (Sh).

Note that the measurement-use output luminous flux (Fo') may be generated from divided output luminous flux (Fo), or may be generated from stray light that occurs in generation of the output luminous flux (Fo) and is not effectively utilized. Any light may be used for the measurement-use output luminous flux (Fo') as long as the light has light quantity correlated with the light quantity of the output luminous flux (Fo).

Then, a control circuit (Mc) receives the generated light quantity measurement data (Sh), and further, independently controls the drive circuits ($P1a$, $P1b$, . . . , $P2a$, $P2b$, . . . ) through respective drive circuit control signals ($J1a$, $J1b$, $J2a$, $J2b$, . . . ) and switches over the state of each of the light emitting elements ($Y1a$, $Y1b$, . . . , $Y2a$, $Y2b$, . . . ) between a state allowing a specific current to flow through the light emitting element and a state allowing a current not to flow through the light emitting element.

The control circuit (Mc) first selects one of the plurality of elemental light sources (U1, U2, . . . ). Then, the control circuit (Mc) acquires the light quantity measurement data (Sh) in a state where light of specified light quantity passes through only the optical fiber included in the selected elemental light source and light does not pass through the optical fibers included in the respective elemental light sources other than the selected elemental light source. Subsequently, the control circuit (Mc) selects another one of the plurality of elemental light sources (U1, U2, . . . ), and acquires the light quantity measurement data (Sh) in a similar manner. In this way, the control circuit (Mc) performs a sequence (hereinafter, also referred to as a "first sequence") of acquiring the light quantity measurement data (Sh) while sequentially selecting all of the plurality of elemental light sources (U1, U2, . . . ) one by one. Consequently, the control circuit (Mc) generates a measurement data set configured of light quantity measurement data (Sh) of the number corresponding to the number of elemental light sources (U1, U2, . . . ).

The control circuit (Mc) examines the measurement data set thus obtained. For example, when N is an integer equal to or lower than the number of elemental light sources (U1, U2, . . . ) and it is determined that N-th light quantity measurement data (Sh) is significantly smaller than other pieces of light quantity measurement data, the control circuit (Mc) detects abnormality in the N-th selected elemental light source of the plurality of elemental light sources (U1, U2, . . . ).

Here, the determination that certain light quantity measurement data (Sh) is significantly small may be made based on the fact that the certain light quantity measurement data (Sh) is smaller than a threshold. The threshold is a value obtained by, when the undetermined rate of variation and fluctuation of the light quantity measurement data (Sh) for each elemental light source (U1, U2, . . . ) that exists in a normal case is assumed to be, for example, 20%, subtracting the undetermined rate from a maximum value Shmax of the measurement data set, namely, the threshold is 80% of the maximum value Shmax. This is because, when the light quantity measurement data (Sh) is smaller than the threshold, contribution of the light from the elemental light source is smaller than that expected, and abnormality may occur.

Alternatively, when selecting one of the plurality of elemental light sources (U1, U2, . . . ), the control circuit (Mc) may acquire the light quantity measurement data (Sh) in a state where light does not pass through only the optical fiber included in the selected elemental light source and light of specified light quantity passes through the optical fibers included in the respective elemental light sources other than the selected elemental light source. Also in this case, similarly to the above, the control circuit performs a sequence (hereinafter, also referred to as a "second sequence") of acquiring the light quantity measurement data (Sh) while sequentially selecting all of the plurality of elemental light sources (U1, U2, . . . ) one by one. Consequently, the control circuit (Mc) generates a measurement data set configured of light quantity measurement data (Sh) of the number corresponding to the number of elemental light sources (U1, U2, . . . ).

Then, in this case, the control circuit (Mc) examines the measurement data set thus obtained. For example, when N is an integer equal to or lower than the number of elemental light sources (U1, U2, . . . ) and it is determined that the N-th light quantity measurement data (Sh) is significantly larger than other pieces of light quantity measurement data, the control circuit (Mc) detects abnormality in the N-th selected elemental light source of the plurality of elemental light sources (U1, U2, . . . ).

Here, the determination that certain light quantity measurement data (Sh) is significantly large is made in a following manner. Undetermined rate of variation and fluctuation of the light quantity measurement data for each elemental light source (U1, U2, . . . ) that exists in a normal case is assumed to be, for example, 20%. At this time, an absolute value of a value obtained by subtracting light quantity measurement data Shfull in a state where light of the specified light quantity passes through all of the optical fibers, from each of the light quantity measurement data (Sh) in the measurement data set, namely, a differential value Sd is calculated. Then, the differential data set formed of the differential values Sd corresponding to the respective light quantity measurement data (Sh) is generated. Then, the determination is made based on the fact that the differential value Sd is smaller than a threshold. The threshold is a value obtained by subtracting the undetermined rate from a maximum value Sdmax of the differential data set, namely, the threshold is 80% of the maximum value Sdmax. This is because, when the differential value Sd is smaller than the threshold, contribution of the light from the elemental light source is smaller than that expect, and abnormality may occur.

Note that, the above description for FIG. 1 is given on the assumption that the light emission quantity of the respective elemental light sources are equal to one another in a case where one of the plurality of elemental light sources (U1, U2, . . . ) is selected and the light of specified quantity passes through only the optical fiber included in the selected elemental light source, or in a case where one of the plurality of elemental light sources (U1, U2, . . . ) is selected and the light of specified quantity passes through the optical fibers included in the respective elemental light sources other than the selected elemental light source. However, the light emission quantity of the respective elemental light sources (U1, U2, . . . ) may be different from one another. In this case, performing correction on the measurement data set or the differential data set makes it possible to detect abnormality more accurately.

Specifically, when N is an integer equal to or lower than the number of elemental light sources (U1, U2, . . . ), $\alpha$ is an appropriate real number, and for example, the light emission quantity of the N-th elemental light source is $\alpha$ times of the light emission quantity of the other elemental light source, correction in which the N-th light quantity measurement data (Sh) is divided by a is performed on the measurement data set in the case where one of the plurality of elemental light sources (U1, U2, . . . ) is selected and the light of specified quantity passes through only the optical fiber included in the selected elemental light source, and the correction is performed on the differential data set in the case where one of the plurality of elemental light sources (U1, U2, . . . ) is selected and the light of specified quantity passes through the optical fibers included in the respective elemental light sources other than the selected elemental light source.

In addition, when light emission quantity of some of the plurality of elemental light sources is different from others, correction may be performed on each of some of the elemental light sources in a similar manner.

Accordingly, as illustrated in FIG. 1, when the selected elemental light source includes the plurality of drive circuits, the control circuit (Mc) controls any number of drive circuits appropriately selected from the plurality of drive circuits to flow a current specified to an appropriate value through the light emitting elements connected to the respective drive circuits. Then, in that state, performing the above-described correction in response to the integrated light quantity of the selected elemental light sources makes it possible to accurately detect abnormality occurred in any of the plurality of elemental light sources (U1, U2, . . . ).

Note that, as described above, abnormality of the elemental light source (U1, U2, . . . ) detected based on small contribution of light may be handled as abnormality of the optical fiber (Ef1, Ef2, . . . ), namely, as breakage of the optical fiber (Ef1, Ef2, . . . ), from the perspective of security.

This is because the abnormality of the elemental light source (U1, U2, . . . ) is caused by failure of a DC power source included in the elemental light source in some cases, and the abnormality does not cause safety issue as long as safety measures for the DC power source itself and the drive circuit (P1a, P1b, . . . , P2a, P2b, . . . ) are provided although the abnormality is an issue of functional failure of the unit. Therefore, at least overlooking of danger is prevented by alerting the detected abnormality of the elemental light source (U1, U2, . . . ) as breakage of the optical fiber (Ef1, Ef2, . . . ) that have higher risk, although the detection is false detection in the end.

Naturally, if a mechanism to detect abnormality of the DC power source itself or the drive circuit (P1a, P1b, . . . P2a, P2b, . . . ) is provided, breakage of the optical fiber (Ef1, Ef2, . . . ) may not be alerted even when the abnormality of the elemental light source (U1, U2, . . . ) is detected.

On the other hand, as illustrated in FIG. 1, when the selected elemental light source includes the plurality of drive circuits, the control circuit (Mc) acquires the light measurement data (Sh) in a state where one of the plurality of drive circuits is selected, and only the selected drive circuit allows a specified current to flow through the light emitting element connected to the selected drive circuit and the drive circuits other than the selected drive circuit do not allow a current to flow through the connected light emitting elements. Then, the control circuit (Mc) performs the operation while sequentially selecting all of the drive circuits included in the selected elemental light source one by one. As a result, the measurement data set formed of the light quantity measurement data (Sh) of the number equal to the total number of the drive circuits (P1a, P1b, . . . , P2a, P2b, . . . ) included in all of the plurality of elemental light sources (U1, U2, . . . ).

Hereinafter, the sequence to acquire the light quantity measurement data (Sh) in such a way is also referred to as a "third sequence".

The control circuit (Mc) examines the measurement data set thus obtained. For example, when n is an integer equal to or smaller than the total number of drive circuits (P1a, P1b, . . . , P2a, P2b, . . . ) and it is determined that, for example, the n-th light quantity measurement data (Sh) is significantly smaller than other pieces of light quantity measurement data, the control circuit (Mc) detects possibility of abnormality in a pair of the n-th selected drive circuit out of the plurality of drive circuits (P1a, P1b, . . . , P2a, P2b, . . . ) and the light emitting element connected thereto.

Here, determination that a certain light quantity measurement data (Sh) is significantly small may be performed in a manner similar to the above.

Specifically, for example, when the undetermined rate of fluctuation and variation of the light quantity measurement data (Sh) for each drive circuit (P1a, P1b, . . . , P2a, P2b, . . . ) that exists in a normal case is assumed to be, for example, 20%, the determination may be made based on the fact that the light quantity measurement data (Sh) is smaller than a threshold. The threshold is a value obtained by subtracting the undetermined rate from the maximum value Shmax of the measurement data set, namely, the threshold is 80% of the maximum value Shmax. This is because, when the light quantity measurement data (Sh) is smaller than the threshold, contribution of the light from the drive circuit is smaller than that estimated, and abnormality may occur.

Alternatively, when the control circuit (Mc) selects one of the plurality of drive circuits (P1a, P1b, . . . , P2a, P2b, . . . ), the control circuit may acquire the light quantity measurement data (Sh) in a state where only the selected drive circuit does not allow a current to flow through the light emitting element connected thereto, and the drive circuits other than the selected drive circuit allow the specified current to flow through the respective connected light emitting elements. Also in this case, similarly to the above, the control circuit performs the operation while sequentially selects all of the plurality of elemental light sources (U1, U2, . . . ) one by one. As a result, the measurement data set formed of the light quantity measurement data (Sh) of the number equal to the total number of drive circuits (P1a, P1b, . . . , P2a, P2b, . . . ) included in the entire elemental light sources (U1, U2, . . . ).

Hereinafter, the sequence to acquire the light quantity measurement data (Sh) in such a way is also referred to as a "fourth sequence".

Then, in this case, the control circuit (Mc) examines the measurement data set thus obtained. For example, when n is the above-described integer equal to or lower than the total number of the drive circuits (P1a, P1b, . . . , P2a, P2b, . . . ) and it is determined that, for example, n-th light quantity measurement data (Sh) is significantly larger than other pieces of light quantity measurement data, the control circuit (Mc) detects possibility of abnormality in a pair of the n-th selected drive circuit out of the drive circuits (P1a, P1b, . . . , P2a, P2b, . . . ) and the light emitting element connected thereto.

Here, determination that certain light quantity measurement data (Sh) is significantly large is performed in a manner similar to that described above.

Specifically, undetermined rate of fluctuation and variation of the light quantity measurement data (Sh) for each drive circuit (P1a, P1b, . . . , P2a, P2b, . . . ) that exists also in a normal case is assumed to be, for example, 20%. At this time, an absolute value of a value obtained by subtracting light quantity measurement data Shfull in a state where light of the specified light quantity passes through all of the optical fibers, from each of the light quantity measurement data (Sh) in the measurement data set, namely, the differential value Sd is calculated. Then, the differential data set formed of the differential values Sd corresponding to the respective light quantity measurement data (Sh) is generated. Then, the determination is made based on the fact that the differential value Sd is smaller than a threshold. The threshold is a value obtained by subtracting the undetermined rate from the maximum value Sdmax of the differential data set, namely, the threshold is 80% of the maximum value Sdmax. This is because, when the differential value Sd is smaller than the threshold, contribution of the light from the drive circuit is smaller than that expected, and abnormality may occur.

In addition, similarly to the above, the light emission quantity of the respective elemental light sources may be different from one another depending on selection of the drive circuits (P1a, P1b, . . . , P2a, P2b, . . . ). In such a case, performing correction on the measurement data set or the differential data set makes it possible to detect abnormality accurately.

Specifically, when n is an integer equal to or lower than the number of drive circuits (P1a, P1b, . . . , P2a, P2b, . . . ), a is an appropriate real number, and for example, the light emission quantity of the n-th elemental light source is a times of the light emission quantity of the other elemental light source, correction in which the n-th light quantity measurement data (Sh) is divided by a is performed on the measurement data set in the case where only the selected drive circuit allows the specified current to flow through the light emitting element connected thereto, and the correction is performed on the differential data set in the case where the other drive circuits other than the selected drive circuit allow the specified current to flow through the respective connected light emitting elements.

Further, when the light emission quantity of some of the plurality of elemental light sources is different from others, the correction may be performed on each of some of the elemental light sources in a similar manner.

Incidentally, light extinction period of each of the light emitting elements (Y1a, Y1b, . . . , Y2a, Y2b, . . . ) in the method by the second sequence and the fourth sequence is shorter than the light extinction period in the method by the first sequence and the third sequence.

When the extinction period of each of the light emitting elements (Y1a, Y1b, . . . , Y2a, Y2b, . . . ) is long, ratio of temperature decrease of the light emitting element during the period is large. Therefore, an issue occurs in which long period is necessary until the light emitting element returns the original stable lighting state when the light emitting element is turned on again. Accordingly, the period in which the light emitting element is turned off may be preferably as short as possible. In that respect, it is found that the method by the above-described second and fourth sequences is advantageous. In this case, in a projector using the light source unit according to the embodiment the invention, it becomes possible to perform the above-described sequence during the normal picture projection if the extinction period is made sufficiently short.

In addition to the method described above, to examine the measurement data set described above, for example, a data set to be acquired in a case where the present light source unit is in a normal state, corresponding to the measurement data set, namely, a comparison-use normal data set may be prepared in advance, and the comparison-use normal data set may be compared with the measurement data set actually acquired.

In the simplest method of preparing the comparison-use normal data set, the generation sequence of the measurement data set described above is performed in a state where the light source unit according to the embodiment of the invention is actually in a normal state, and the measurement data set acquired at this time is used as the comparison-use normal data set.

Incidentally, when an output current of a part or all of the plurality of drive circuits (P1a, P1b, . . . , P2a, P2b, . . . ) of the present light source unit is increased or decreased to dim light, it is necessary to regenerate the comparison-use normal data set.

Note that, even when the light is not dimmed, it is necessary to periodically generate the comparative-use normal data set or the like because the light emission quantity of the light emitting element (Y1a, Yab, . . . , Y2a, Y2b, . . . ) is decreased by deterioration associated with increase of an accumulated lighting time.

In the above-described examination on the measurement data set formed of the light quantity measurement data (Sh) corresponding to the respective drive circuits (P1a, P1b, . . . , P2a, P2b, . . . ), when abnormality common to all of the drive circuits corresponding to the specific one of the elemental light sources (U1, U2, . . . ) is detected, the abnormality is detected as abnormality of the specific elemental light source.

At this time, as described above, the abnormality of the elemental light source (U1, U2, . . . ) may be handled as abnormality by breakage of corresponding optical fiber (Ef1, Ef2, . . . ).

Further, in the case where the abnormality of the elemental light source is handled as the abnormality of the optical fiber in this way, when abnormality is detected in the drive circuit that is not included in the elemental light source including the optical fiber in which the abnormality is detected but is included in the specific elemental light source in the above-described examination with respect to the measurement data set, the abnormality may be handled as abnormality in a pair of the drive circuit in which the abnormality is detected and the light emitting element connected thereto.

Further, when abnormality is detected in one of the plurality of drive circuits (P1a, P1b, . . . , P2a, P2b, . . . ) in the above-described examination for the measurement data set, if there is the other drive circuit in which abnormality is not detected in the elemental light source including the drive circuit in which the abnormality is detected, the abnormality does not occur in the optical fiber included in the elemental light source. Therefore, the abnormality may be handled as abnormality in a pair of the drive circuit in which the abnormality is detected and the light emitting element connected thereto.

Note that, regarding to the light source unit illustrated in FIG. 1, wavelength band of the light emitting elements (Y1a, Y1b, . . . , Y2a, Y2b, . . . ), namely, a color is not particularly described; however, this does not mean that the light source unit illustrated in FIG. 1 is not applicable to application in which color display of an image is performed. It is possible to obtain light of a plurality of different wavelength bands by using a plurality of present light source units, for example, it is possible to configure a projector capable of performing color display by using the light source unit of R-color mounted with only R-color light emitting elements, the light source unit of G-color mounted with only G-color light emitting elements, and the light source unit of B-color mounted with only B-color light emitting elements, namely, by using three present light source units of R-color, G-color, and B-color.

Figure 4:
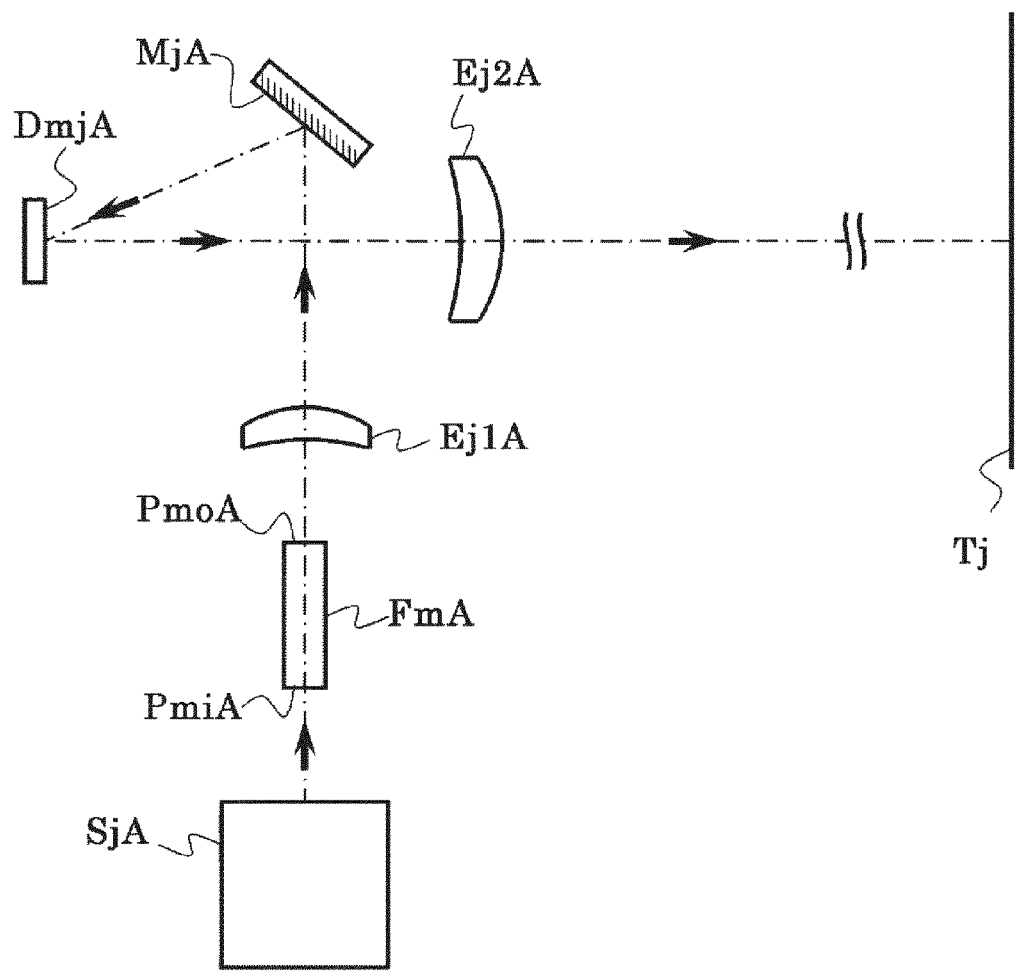
FIG. 4 is a diagram for explaining a part of one kind of existing projectors of a related art.

Specifically, for example, in a projector optical system having a configuration as illustrated in FIG. 4, a first optical system generating an R-color image, a second optical system generating a G-color image, and a third optical system generating a B-color image are prepared. Here, the first optical system uses the light source unit of R-color in FIG. 1, as a light source (SjA). Output luminous flux (Fo) of the first light source unit of R-color in FIG. 1 is input to an incident end (PmiA) of a first homogenizing means (FmA) to illuminate a first two-dimensional light intensity modulator (DmjA) with R-color light, and an R-color image formed of light reflected by the first two-dimensional light intensity modulator (DmjA) is generated. Likewise, the second optical system uses the light source unit of G-color in FIG. 1, as the light source (SjA). Output luminous flux (Fo) of the second light source unit of G-color is input to an incident end (PmiA) of a second homogenizing means (FmA) to illuminate a second two-dimensional light intensity modulator (DmjA) with G-color light, and a G-color image formed of light reflected by the second two-dimensional light intensity modulator (DmjA) is generated. Likewise, the third optical system uses the light source unit of B-color in FIG. 1, as the light source (SjA). Output luminous flux (Fo) of the third light source unit of B-color is input to an incident end (PmiA) of a third homogenizing means (FmA) to illuminate a third two-dimensional light intensity modulator (DmjA) with B-color light, and a B-color image formed of light reflected by the third two-dimensional light intensity modulator (DmjA) is generated.

Then, the images of three colors R, G, and B generated in the first optical system, the second optical system, and the third optical system, respectively, are synthesized, and the synthesized image is projected on a screen (Tj) with use of an image projection lens (Ej2A).

Note that the control circuit (Mc) may be common to the three light source units described above.

Figure 2:
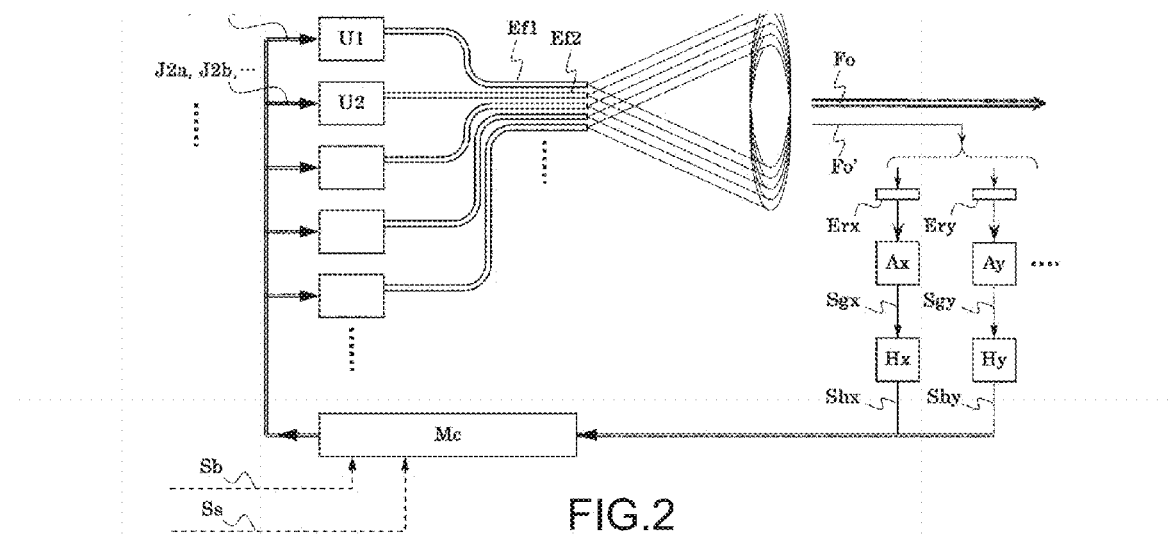
FIG. 2 is a block diagram illustrating the light source unit according to an embodiment of the invention in a simplified manner.

Next, with reference to FIG. 2, another embodiment of the present invention is described. FIG. 2 is a block diagram illustrating a light source unit according to the embodiment of the invention in a simplified manner.

In the light source unit according to the embodiment of the invention in FIG. 2, a plurality of light emitting elements (Y1a, Y1b, ..., Y2a, Y2b, ...) included in the plurality of elemental light sources (U1, U2, ...) includes light emitting elements different in wavelength band of light emission wavelength such as R, G, and B.

Similarly to those described in FIG. 1, light radiated from the exit ends of the respective optical fibers (Ef1, Ef2, ...) of the plurality of elemental light sources (U1, U2, ...) is integrated, and the integrated light is output from the light source unit according to the embodiment of the invention, as single output luminous flux (Fo) of white color. Here, in the radiated light before integration, light of a plurality of different wavelength bands are mixed. Naturally, as for each of the plurality of optical fibers (Ef1, Ef2, ...), light of a single wavelength band may be guided in one optical fiber, or light of a plurality of wavelength bands are mixed and mixed light may be guided in one optical fiber as white light.

Then, to generate the light quantity measurement data (Shx, Shy, ...) correlated with the light quantity of the output luminous flux (Fo) for each wavelength band, similarly to the output luminous flux (Fo), measurement-use luminous flux (Fo') configured by integrating part of light radiated from respective exit ends is generated. Here, in the light radiated from respective exit ends before integration, light of the plurality of different wavelength bands are mixed. Then, the measurement-use luminous flux (Fo') is applied to each of the plurality of optical sensors (Ax, Ay, ...), and necessary processing such as amplification and AD conversion is performed on signals (Sgx, Sgy, ...) of the plurality of optical sensors (Ax, Ay, ...) by respective light quantity measurement circuits (Hx, Hy, ...) to generate the light quantity measurement data (Shx, Shy, ...).

Incidentally, spectral filters (Erx, Ery, ...) that allow light to selectively pass therethrough corresponding to the respective wavelength bands, are respectively provided in front of the plurality of optical sensors (Ax, Ay, ...).

The control circuit (Mc) receives the light quantity measurement data (Shx, Shy, ...) generated for each wavelength band. However, at the time of generating the measurement data set, it is sufficient for the control circuit (Mc) to acquire only the light quantity measurement data of the optical sensor corresponding to the wavelength band including the light emitting element to be supplied with the specified current by the control circuit (Mc).

This is because the light quantity measurement data from the optical sensor corresponding to the wavelength band not including the light emitting element through which a current is flowing is basically invalid.

Note that when photodetection sensitivity is varied depending on the wavelength band or fluctuation of each optical sensor (Ax, Au, ...), the variation may be absorbed by gain setting of the light quantity measurement circuits (Hx, Hy, ...) or the like, or the above-described correction may be performed on the measurement data set.

Incidentally, in the case where the spectral characteristics of the spectral filters (Erx, Ery, ...) are not completely matched with the light emission wavelength band of the light emitting elements (Y1a, Y1b, ..., Y2a, Y2b, ...), for example, when the light emitting element corresponding to only one wavelength band emits light out of the plurality of light emitting elements, phenomenon in which data of two colors appear occurs in the light quantity measurement data (Shx, Shy, ...) and color data mixing occurs. Therefore, correct processing is not performed as it is. In such a case, the control circuit (Mc) performs linear computing on the light quantity measurement data (Shx, Shy, ...) for each color to correct the color of the light quantity measurement data, thereby avoiding such difficulty.

Specifically, when signal values of each of colors R, G, and B of the light quantity measurement data (Shx, Shy, ...) are represented by Vr, Vg, and Vb, the color-corrected signal values Vx, Vy, and Vz for each wavelength band are obtainable by the following linear expressions (1) to (3).

$Vx = K11 \cdot Vr + K12 \cdot Vg + K13 \cdot Vb$   Linear expression (1):

$Vy = K21 \cdot Vr + K22 \cdot Vg + K23 \cdot Vb$   Linear expression (2):

$Vz = K31 \cdot Vr + K32 \cdot Vg + K33 \cdot Vb$   Linear expression (3):

Here, K11, K12, ..., K32, and K33 are constant coefficients for linear operation, and a combination of the constant coefficients that corrects the above-described color data mixing may be determined experimentally. Incidentally, when the above-described color data mixing does not occur, the constant coefficients other than the diagonal components K11, K22, and K33 are set to 0 in the above-described linear expressions.

With the configuration described above, each of the light quantity measurement data of the measurement data set may be subjected to the above-described examination, irrespective of the wavelength band to which the light quantity measurement data belongs. Accordingly, even when the luminous flux (Fo) in which light of the plurality of different wavelength bands are mixed is generated, the light source unit according to the embodiment of the invention illustrated in FIG. 2 performs the above-described sequence to detect abnormality of the elemental light source (U1, U2, ...) or abnormality in a pair of the drive circuit (P1a, P1b, ..., P2a, P2b, ...) and the light emitting element (Y1a, Y1b, ..., Y2a, Y2b, ...) connected thereto.

The light source unit according to the embodiment of the invention in FIG. 1 generates the light quantity measurement data (Sh) correlated with brightness of the measurement-use output luminous flux (Fo') that is proportional to the light quantity of its output luminous flux (Fo), and the control circuit (Mc) receives the generated light quantity measurement data (Sh), even in a period in which the above-described sequence is not performed. Accordingly, when the control circuit (Mc) is adapted to set a current amount flowing through the light emitting elements (Y1a, Y1b, Y2a, Y2b, ...) connected to the respective drive circuits (P1a, P1b, ..., P2a, P2b, ...) of the plurality of elemental light sources (U1, U2, ...) through the respective drive circuit control signals (J1a, J1b, ..., J2a, J2b, ...), the light source unit according to the embodiment of the invention performs stabilization of the light quantity by performing feedback control so that a difference between the light quantity measurement data (Sh) and the target value becomes small.

Incidentally, when the size of the light quantity measurement data (Sh) is determined by the sum of the contribution of light of the drive circuits (P1a, P1b, ..., P2a, P2b, ...), the light source unit may perform the feedback control by increasing or decreasing the current amount of all of the drive circuits at a time, or may perform the feedback control by increasing or decreasing the current value of only a part of the drive circuits (P1a, P1b, ..., P2a, P2b, ...).

Further, in the case of application using the plurality of different wavelength bands, for example, in the case of application using the plurality of light source units for each of colors R, G, and B, the stabilization of light quantity for each color is performed, and the color is accordingly stabilized.

Further, the light source unit according to the embodiment of the invention in FIG. 2 generates the output luminous flux (Fo) in which a plurality of different wavelength bands, for example, light of colors of R, G, and B are mixed, and includes the optical sensors (Ax, Ay, . . . ) provided with the respective spectral filters (Erx, Ery, . . . ) in front thereof. Therefore, the light source unit generates the light quantity measurement data (Shx, Shy, . . . ) for each of colors R, G, and B, and the control circuit (Mc) receives the light quantity measurement data (Shx, Shy, . . . ). Accordingly, when the control circuit (Mc) is adapted to set the current amount flowing through the light emitting elements (Y1a, Y1b, . . . , Y2a, Y2b, . . . ) connected to the respective drive circuits (P1a, P1b, . . . , P2a, P2b, . . . ) of the plurality of elemental light sources (U1, U2, . . . ) through the respective drive circuit control signals (J1a, J1b, . . . , J2a, J2b, . . . ), the light source unit according to the embodiment of the invention performs stabilization of the light quantity by performing the feedback control so that difference between the light quantity measurement data (Shx, Shy, . . . ) and the respective target values become small, and performs stabilization of colors at the same time.

Incidentally, in a case where an external apparatus using the output luminous flux (Fo) of the light source unit according to the embodiment of the invention is, for example, a projector, when the above-described sequence is performed during projection of a picture, variation occurs in the output luminous flux (Fo). As a result, adverse effect such as mixing of flicker in the picture may occur. Accordingly, there is an issue that the above-described sequence is not started by determination of the light source unit by itself at a time other than activation of the light source unit.

The issue is solved by the configuration in which the external apparatus is configured to transmit an abnormality detection activation signal (Sb) at a timing when disadvantage does not occur even if the sequence causes variation of the output luminous flux (Fo), and the light source unit according to the embodiment of the invention is configured to receive the abnormality detection activation signal (Sb) from the external apparatus and to start the sequence at the time when receiving the abnormality detection activation signal (Sb).

As described above, in the case where the external apparatus is a projector, for example, it is possible to cause the light source unit to perform the sequence without adverse effect by transmitting the abnormality detection activation signal (Sb) at relatively long break of pictures such as darkening of the pictures.

Further, in the light source unit according to the embodiment of the invention, the above-described sequence is segmented and divided into a plurality of steps, and the external apparatus is adapted to transmit a sequence step signal (Ss) every timing at which one step is startable and performable. Then, when receiving the sequence step signal (Ss), the light source unit according to the embodiment of the invention may start and perform one step, and may complete the above-described sequence by receiving the sequence step signal (SS) a plurality of times.

Here, in the segmentation of the sequence, a series of operations started with selection of one or more of the drive circuits after selection of one of the plurality of elemental light sources (U1, U2, . . . ) and ended with acquisition of the light quantity measurement data (Sh, Shx, Shy, . . . ) at the time is handled as one step.

As described above, in the case where the external apparatus is a projector, for example, it is possible to cause the light source unit to perform the sequence without adverse effect by transmitting the sequence step signal (Ss) in a short period when a black screen is inserted such as switching an image between a right-eye image and a left-eye image for stereoscopic picture projection.

Note that the sequence step signal (Ss) is continuously transmitted from the external apparatus.

Specific example of a method of utilizing the sequence step signal (Ss) may include a method in which, when the external apparatus determines that it is necessary to perform the above-described sequence, the external apparatus transmits the abnormality detection activation signal (Sb), and when the light source unit receives the signal, the light source unit starts and performs the sequence with use of the sequence step signal (Ss).

Alternatively, when the external apparatus determines that it is necessary to perform the above-described sequence, the external apparatus starts to transmit the sequence step signal (Ss), and the light source unit may perform the sequence while receiving the signal. Incidentally, in this case, since the number of sequence step signals (Ss) necessary for completion of the above-described sequence is unknown, the light source unit may preferably output a signal that notifies completion of the above-described sequence, to the external apparatus at the time when the above-described sequence is completed.

Figure 3:
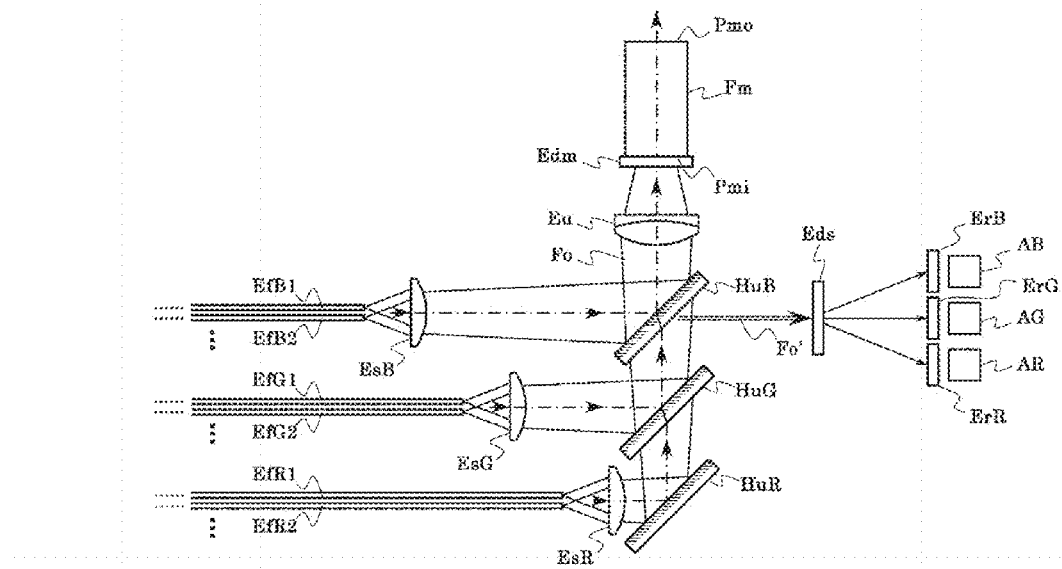
FIG. 3 is a diagram illustrating the light source unit according to an embodiment of the invention in a simplified manner

Next, with reference to FIG. 3, more specific configuration of a projector using the light source unit according to the embodiment of the invention, in particular, more specific configuration of the optical fibers and subsequent to the exit ends of the optical fibers in the projector is described as an embodiment of the invention. FIG. 3 is a diagram illustrating an embodiment of the light source unit according to the embodiment of the invention in a simplified manner.

The light source unit according to the embodiment of the invention in FIG. 3 includes three fiber bundles corresponding to three primary colors of R, G, and B. These fiber bundles are formed by bundling a plurality of optical fibers for each color, namely, by respectively bundling optical fibers for R-color light source (EfR1, EfR2, . . . ), optical fibers for G-color light source (EfG1, EfG2, . . . ), and optical fibers for B-color light source (EfB1, EfB2, . . . ) while exit ends thereof are aligned. Further, the light source unit performs color synthesis of luminous fluxes that are obtained by converting light output from the respective exit ends of the three fiber bundles into infinite images by collimator lenses (EsR, EsG, EsB) with use of mirror (HuR) and dichroic mirrors (HuG, HuB) to generate the output luminous flux (Fo) of the light source unit.

Then, the output luminous flux (Fo) enters a focusing lens (Eu), and the condensed output luminous flux then enters an incident end (Pmi) of a homogenizing means (Fm) that is configured of a rod integrator, through a diffusion element (Edm) for removing speckle. The optical system subsequent to the exit end (Pmo) of the homogenizing means (Fm) is similar to that described with reference to FIG. 4 described above.

Figure 5:
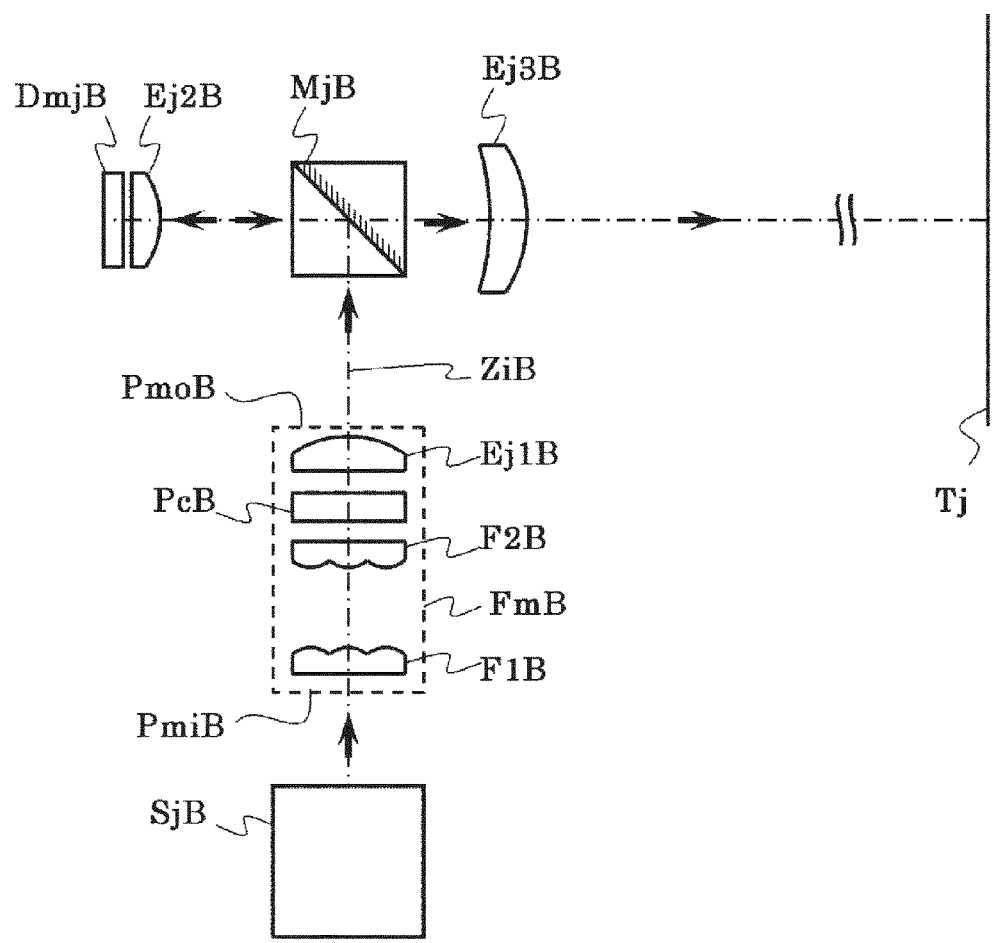
FIG. 5 is a diagram for explaining a part of one kind of existing projectors of a related art.

Naturally, the light source unit according to the embodiment of the invention may be used in a projector using a homogenizing means configured of a fly eye integrator, described with reference to FIG. 5 described above.

The dichroic mirror (Hub) is fabricated so as to allow light of two colors, R and G to pass therethrough as much as possible and to reflect light of B-color as much as possible. However, reflected light of two colors R and G and transmitted light of B-color exist to no small extent, and normally, such light is discarded as stray light. However, in the light source unit in FIG. 3, such light is effectively used to acquire the measurement output luminous flux (Fo').

The measurement-use output luminous flux (Fo') is used to measure quantity of light of each of colors R, G, and B by optical sensors (AR, AG, AB) through diffusion element (Eds). The optical sensors (AR, AG, AB) include, in front of the optical sensors (AR, AG, AB), spectral filters (ErR, ErG, ErB) each selectively allowing light of colors R, G, and B to pass therethrough, respectively. The diffusion element (Eds) suppresses measurement variation by influence of speckle.

Note that component ratio of light of colors R, G, and B of the measurement-use output luminous flux (Fo') thus generated is not always the same as that of the output luminous flux (Fo), but may be corrected by setting of a gain of a light quantity measurement circuit for light of each color provided on rear stage of the optical sensors (AR, AG, AB) as described above with reference to FIG. 2.

Incidentally, the optical sensors (AR, AG, AB) may be disposed in such a manner that a part of luminous fluxes at three positions immediately after the collimator lenses (EsR, EsG, EsB) may be divided by interposing a semitransmittive mirror, etc., and each of the divided luminous fluxes may be irradiated separately to the optical sensors (AR, AG, AB). In this configuration, it is necessary to add a semitransmissive mirror for the above-described luminous flux dividing, whereas the above-described spectral filters (ErR, ErG, ErB) become unnecessary. Incidentally, this configuration corresponds to a case where three light source units for respective colors of R-color, G-color, and B-color are combined and used as described above.

Note that the technology may be configured as follows.

(1) A light source unit including:

a plurality of elemental light sources each including one or more light emitting elements, one or more drive circuits, a focusing optical system, and an optical fiber, and configured to integrate radiated light from exit ends of the respective optical fibers to output one output luminous flux, the one or more drive circuits being provided corresponding to the respective light emitting elements and selectively operating in a driving state allowing a specified current to flow through the corresponding light emitting element or in a non-driving state allowing the current not to flow through the corresponding light emitting element, the focusing optical system focusing light emitting from the one or more light emitting elements, and the optical fiber receiving light focused by the focusing optical system at an incident end to guide the light and radiating the light from the exit end;

an optical sensor irradiated with at least a part of the output luminous flux;

a light quantity measurement circuit configured to generate light quantity measurement data correlated with a light quantity of the output luminous flux, based on a quantity of incident light to the optical sensor; and a control circuit configured to control the plurality of drive circuits based on the light quantity measurement data, to perform a sequence sequentially acquiring the light quantity measurement data by sequentially selecting one of the plurality of elemental light sources, putting at least one of the one or more drive circuits included in the selected elemental light source into a first state, and putting the plurality of drive circuits other than the at least one drive circuits into a second state, and to detect abnormality based on measurement data set formed of a plurality of pieces of the acquired light quantity measurement data, the first state being one of the driving state and the non-driving state, and the second state being the other of the driving state and the non driving state.

(2) The light source unit according to (1), wherein
when the selected elemental light source having a plurality of the drive circuits, the control circuit acquires the light quantity measurement data by sequentially selecting one of the plurality of drive circuits, putting the selected drive circuit into the first state, and putting the plurality of drive circuits other than the selected drive circuit into the second state.

(3) The light source unit according to (2), wherein
the first state is the driving state, and
the second state is the non-driving state.

(4) The light source unit according to (2), wherein
the second state is the driving state, and
the first state is the non-driving state.

(5) The light source unit according to any one of (1) to (4), wherein
the plurality of light emitting elements in the plurality of elemental light sources includes a plurality of light emitting elements different in light emission wavelength band from one another,
the optical sensor includes a plurality of optical sensors provided corresponding to the plurality of wavelength bands,
each of the optical sensors has a spectral filter allowing light of corresponding wavelength band to selectively pass through the spectral filter,
the light quantity measurement data includes a plurality of pieces of light quantity measurement data correlated with light quantity of each of the wavelength band in the output luminous flux, and
the control circuit acquires at least light quantity measurement data corresponding to a light emission wavelength band of the light emitting element supplied with the specified current, out of the plurality of pieces of light quantity measurement data.

(6) The light source unit according to any one of (1) to (5), wherein
the control circuit detects abnormality by comparing a data set to be acquired when the light source unit is in a normal state, with the measurement data set actually acquired, the data set to be acquired corresponding to the measurement data set.

(7) The light source unit according to any one of (1) to (6), wherein
when detecting significant shortage of light quantity of the output luminous flux in a plurality of pieces of light quantity measurement data that is acquired when any of the drive circuits included in a specific elemental light source out of the plurality of elemental light sources is put into the driving state, the control circuit detects abnormality of the optical fiber included in the specified elemental light source.

(8) The light source unit according to (7), wherein
when detecting significant shortage of light quantity of the output luminous flux in light quantity measurement data corresponding to a specific drive circuit not included in the specific elemental light source that includes the optical fiber in which the abnormality is detected, the control circuit detects abnormality in a pair of the specific drive circuit and a light emitting element connected to the specific drive circuit.

(9) The light source unit according to any one of (5) to (8), wherein
the control circuit adjusts a value of a current value flowing through the light emitting elements corresponding to the respective drive circuits by feedback control, to make a difference between the plurality of pieces of light quantity measurement data and respective target values of the plurality of pieces of light quantity measurement data small, in a period in which the sequence is not performed.

(10) The light source unit according to any one of (1) to (9), wherein
the control circuit is adapted to receive an abnormality detection activation signal output from an external apparatus using the output luminous flux, and to start the sequence upon receiving the abnormality detection activation signal.

(11) The light source unit according to any one of (1) to (10), wherein
the control circuit is adapted to receive a sequence step signal output from an external apparatus using the output luminous flux, and to start a series of operations started with selection of one or more of the drive circuits after selection of one of the plurality of elemental light sources and ended with acquisition of the light quantity measurement data at the time, as one step upon receiving the sequence step signal.

(12) A projector including:
the light source unit according to any one of (1) to (10); and
an apparatus configured to use the output luminous flux output from the light source unit, the apparatus transmitting one of an abnormality detection activation signal and a sequence step signal to the light source unit.

It should be understood by those skilled in the art that various modifications, combinations, sub-combinations, and alterations may occur depending on design requirements and other factors insofar as they are within the scope of the appended claims or the equivalents thereof.

What is claimed is:

1. A light source unit comprising:
a plurality of elemental light sources each including one or more light emitting elements, one or more drive circuits, a focusing optical system, and an optical fiber, the light source unit being configured to integrate radiated light from exit ends of the respective optical fibers and to output one output luminous flux, the one or more drive circuits being provided corresponding to the respective light emitting elements and being configured to selectively operate in a driving state that allows a specified current to flow through the corresponding light emitting element or in a non-driving state that allows the current not to flow through the corresponding light emitting element, the focusing optical system being configured to focus lights emitted from the one or more light emitting elements, and the optical fiber being configured to receive a light focused by the focusing optical system at an incident end of the optical fiber, and the optical fiber being configured to guide the light and radiate the light from the exit end;
an optical sensor configured to be irradiated with at least a part of the output luminous flux;
a light quantity measurement circuit configured to generate a light quantity measurement data correlated with a light quantity of the output luminous flux, based on a quantity of incident light to the optical sensor; and
a control circuit configured to control the drive circuits based on the light quantity measurement data, to perform a sequence that sequentially acquires the light quantity measurement data by sequentially selecting one of the plurality of elemental light sources, putting at least one of the one or more drive circuits included in the selected elemental light source into a first state, and putting the plurality of drive circuits other than the at least one drive circuits into a second state, and to detect abnormality based on a measurement data set formed of a plurality of pieces of the acquired light quantity measurement data,
wherein the first state being one of the driving state and the non-driving state, and the second state being the other of the driving state and the non-driving state,
wherein
the plurality of light emitting elements being configured to emit lights different in wavelength band from one another,
the optical sensor includes a plurality of optical sensors provided corresponding to the wavelength bands,
each of the optical sensors includes a spectral filter that allows light of the corresponding wavelength band to selectively pass through the spectral filter,
the light quantity measurement data includes a plurality of pieces of light quantity measurement data correlated with light quantity of each of the wavelength bands in the output luminous flux, and
the control circuit being configured to acquire at least light quantity measurement data corresponding to a light emission wavelength band of the light emitting element supplied with the specified current, out of the plurality of pieces of light quantity measurement data.

2. The light source unit according to claim 1, wherein when the selected elemental light source has a plurality of the drive circuits, the control circuit acquires the light quantity measurement data by sequentially selecting one of the plurality of drive circuits, putting the selected drive circuit into the first state, and putting the plurality of drive circuits other than the selected drive circuit into the second state.

3. The light source unit according to claim 2, wherein
the first state is the driving state, and
the second state is the non-driving state.

4. The light source unit according to claim 2, wherein
the second state is the driving state, and
the first state is the non-driving state.

5. The light source unit according to claim 1, wherein the control circuit detects abnormality by comparing a data set to be acquired when the light source unit is in a normal state, with the measurement data set actually acquired, the data set to be acquired corresponding to the measurement data set.

6. The light source unit according to claim 1, wherein when detecting significant shortage of light quantity of the output luminous flux in a plurality of pieces of light quantity measurement data that is acquired when any of the drive circuits included in a specific elemental light source out of the plurality of elemental light sources is put into the driving state, the control circuit detects abnormality of the optical fiber included in the specified elemental light source.

7. The light source unit according to claim 1, wherein the control circuit being configured to adjust a value of a current that flows through the light emitting elements corresponding to the respective drive circuits by a feedback control, to make a difference between the plurality of pieces of light quantity measurement data and respective target values of the plurality of pieces of light quantity measurement data small, in a period in which the sequence is not performed.

8. The light source unit according to claim 1, wherein the control circuit is adapted to receive an abnormality detection activation signal output from an external apparatus using the output luminous flux, and to start the sequence upon receiving the abnormality detection activation signal.

9. A projector comprising:

the light source unit according to claim 1; and an apparatus configured to use the output luminous flux output from the light source unit, the apparatus transmitting one of an abnormality detection activation signal and a sequence step signal to the light source unit.

10. A light source unit comprising:

a plurality of elemental light sources each including one or more light emitting elements, one or more drive circuits, a focusing optical system, and an optical fiber, the light source unit being configured to integrate radiated light from exit ends of the respective optical fibers and to output one output luminous flux, the one or more drive circuits being provided corresponding to the respective light emitting elements and being configured to selectively operate in a driving state that allows a specified current to flow through the corresponding light emitting element or in a non-driving state that allows the current not to flow through the corresponding light emitting element, the focusing optical system being configured to focus lights emitted from the one or more light emitting elements, and the optical fiber being configured to receive a light focused by the focusing optical system at an incident end of the optical fiber, and the optical fiber being configured to guide the light and radiate the light from the exit end;

an optical sensor configured to be irradiated with at least a part of the output luminous flux;

a light quantity measurement circuit configured to generate a light quantity measurement data correlated with a light quantity of the output luminous flux, based on a quantity of incident light to the optical sensor; and a control circuit configured to control the drive circuits based on the light quantity measurement data, to perform a sequence that sequentially acquires the light quantity measurement data by sequentially selecting one of the plurality of elemental light sources, putting at least one of the one or more drive circuits included in the selected elemental light source into a first state, and putting the plurality of drive circuits other than the at least one drive circuits into a second state, and to detect abnormality based on a measurement data set formed of a plurality of pieces of the acquired light quantity measurement data, wherein the first state being one of the driving state and the non-driving state, and the second state being the other of the driving state and the non-driving state, wherein when detecting significant shortage of light quantity of the output luminous flux in light quantity measurement data corresponding to a specific drive circuit not included in the specific elemental light source that includes the optical fiber in which the abnormality is detected, the control circuit detects abnormality in a pair of the specific drive circuit and a light emitting element connected to the specific drive circuit.

11. A light source unit comprising:

a plurality of elemental light sources each including one or more light emitting elements, one or more drive circuits, a focusing optical system, and an optical fiber, the light source unit being configured to integrate radiated light from exit ends of the respective optical fibers and to output one output luminous flux, the one or more drive circuits being provided corresponding to the respective light emitting elements and being configured to selectively operate in a driving state that allows a specified current to flow through the corresponding light emitting element or in a non-driving state that allows the current not to flow through the corresponding light emitting element, the focusing optical system being configured to focus lights emitted from the one or more light emitting elements, and the optical fiber being configured to receive a light focused by the focusing optical system at an incident end of the optical fiber, and the optical fiber being configured to guide the light and radiate the light from the exit end;

an optical sensor configured to be irradiated with at least a part of the output luminous flux;

a light quantity measurement circuit configured to generate a light quantity measurement data correlated with a light quantity of the output luminous flux, based on a quantity of incident light to the optical sensor; and a control circuit configured to control the drive circuits based on the light quantity measurement data, to perform a sequence that sequentially acquires the light quantity measurement data by sequentially selecting one of the plurality of elemental light sources, putting at least one of the one or more drive circuits included in the selected elemental light source into a first state, and putting the plurality of drive circuits other than the at least one drive circuits into a second state, and to detect abnormality based on a measurement data set formed of a plurality of pieces of the acquired light quantity measurement data, wherein the first state being one of the driving state and the non-driving state, and the second state being the other of the driving state and the non-driving state, wherein the control circuit is adapted to receive a sequence step signal output from an external apparatus using the output luminous flux, and to start a series of operations started with selection of one or more of the drive circuits after selection of one of the plurality of elemental light sources and ended with acquisition of the light quantity measurement data at the time, as one step upon receiving the sequence step signal.

* * * * *